United States Patent
Lin (10) Patent No.: US 9,640,095 B2
(45) Date of Patent: May 2, 2017

(54) PHOTOGRAPHY LIGHT PANEL REFLECTOR CLAMP

(71) Applicant: Chien-Ting Lin, Santa Fe Springs, CA (US)

(72) Inventor: Chien-Ting Lin, Santa Fe Springs, CA (US)

( * ) Notice: Subject to any disclaimer, the term of this patent is extended or adjusted under 35 U.S.C. 154(b) by 0 days.

(21) Appl. No.: 15/173,618

(22) Filed: Jun. 4, 2016

(65) Prior Publication Data

US 2016/0281964 A1    Sep. 29, 2016

Related U.S. Application Data

(63) Continuation-in-part of application No. 14/139,795, filed on Dec. 23, 2013, now abandoned.

(51) Int. Cl.
*G09F 7/18* (2006.01)
*G03B 15/06* (2006.01)
(Continued)

(52) U.S. Cl.
CPC ............... *G09F 7/18* (2013.01); *F16B 2/065* (2013.01); *F16M 11/00* (2013.01); *F21V 7/18* (2013.01); *F21V 21/088* (2013.01); *G03B 15/06* (2013.01); *G09F 15/0025* (2013.01); *G09F 15/0037* (2013.01); *G09F 2007/183* (2013.01); *G09F 2007/1804* (2013.01); *G09F 2007/1813* (2013.01); *G09F 2007/1817* (2013.01)

(58) Field of Classification Search
CPC .... G09F 7/18; G09F 15/0025; G09F 15/0037; G09F 2007/1813; G09F 2007/1817; G09F 2007/1804; G09F 2007/183; F16B 2/065; G03B 15/06

USPC .......................................... 248/218.4, 219.4
See application file for complete search history.

(56) References Cited

U.S. PATENT DOCUMENTS 1,871,138 A * 8/1932 Ward, Jr. ............... F25D 23/026
                                                                220/212.5
3,003,646 A * 10/1961 Wolf ......................... A47F 5/04
                                                                211/107
(Continued)

FOREIGN PATENT DOCUMENTS

CH    DE 29501124 U1 *  3/1995    ............... G09F 7/18
DE       19648061 A1 *  6/1998    ............... G09F 7/18
(Continued)

*Primary Examiner* — Eret McNichols
(74) *Attorney, Agent, or Firm* — Lin & Associates Intellectual Property, Inc.

(57) ABSTRACT

The present invention provides a photography light panel reflector clamp for mounting a photography light panel reflector with a rod member. The photography light panel reflector clamp of the present invention includes a central member, a groove and a turning clamp set. A rod member clamping seat is disposed on the central member, and a mounting portion is disposed at an opening of the rod member clamping seat. The groove is formed across a mounting face on a side of the central member, and the turning clamp set is disposed on the central member next to the groove. A flange of the photography light panel reflector has a segment fitted in the groove, and the turning clamp set is utilized to fix the segment of the flange of the photography light panel reflector in the groove with the photography light panel reflector clamp.

5 Claims, 6 Drawing Sheets (51) Int. Cl.
*F16B 2/06* (2006.01)
*G09F 15/00* (2006.01)
*F21V 21/088* (2006.01)
*F21V 7/18* (2006.01)
*F16M 11/00* (2006.01)

(56) References Cited

U.S. PATENT DOCUMENTS

| | | | | |
|---|---|---|---|---|
| 3,462,110 A * | 8/1969 | Cheslock | | A47B 57/56 248/219.4 |
| 4,460,142 A * | 7/1984 | O'Rorke | | F16B 2/08 248/214 |
| 5,634,619 A * | 6/1997 | Alessi | | A47B 57/565 248/219.3 |
| 6,193,252 B1 * | 2/2001 | Lin | | B62B 7/12 280/204 |
| 6,494,327 B2 * | 12/2002 | Huang | | A47F 5/0892 211/107 |
| 6,527,240 B1 * | 3/2003 | Huang | | A47G 23/0225 248/218.4 |
| 7,060,040 B2 * | 6/2006 | Farmer | | A47B 57/565 600/573 |
| 7,527,567 B2 * | 5/2009 | Ohle | | A63B 69/002 473/420 |
| 7,575,209 B1 * | 8/2009 | Wiese | | G09F 17/00 248/218.4 |
| 7,997,547 B1 * | 8/2011 | Maus | | G09F 15/0025 248/218.4 |
| 8,047,492 B2 * | 11/2011 | Wang | | B62H 3/12 211/106.01 |
| 8,413,934 B2 * | 4/2013 | Hara | | F15B 15/149 138/108 |
| 8,534,622 B2 * | 9/2013 | Vanover | | F16M 11/046 211/100 |
| 8,733,720 B2 * | 5/2014 | Wilkinson | | G09F 7/002 116/174 |
| 8,794,578 B2 * | 8/2014 | Lin | | H01Q 1/1228 248/218.4 |
| 8,905,249 B2 * | 12/2014 | Whitacre | | E04B 2/7416 211/204 |
| 9,107,496 B2 * | 8/2015 | Lindo | | A47K 3/281 |
| 2004/0226903 A1 * | 11/2004 | Wang | | A47B 57/00 211/187 |
| 2005/0147464 A1 * | 7/2005 | Lee | | F16B 7/105 403/379.2 |
| 2006/0022099 A1 * | 2/2006 | Sparkowski | | G09F 15/0037 248/218.4 |
| 2009/0321597 A1 * | 12/2009 | Matsumoto | | A47G 25/0607 248/219.4 |
| 2010/0102185 A1 * | 4/2010 | Jenestreet | | F16B 12/42 248/218.4 |
| 2010/0225459 A1 * | 9/2010 | Lee | | B60Q 1/503 340/432 |
| 2011/0170276 A1 * | 7/2011 | Astill | | G03B 15/06 362/16 |
| 2012/0097817 A1 * | 4/2012 | Lin | | F21V 21/14 248/314 |
| 2012/0181397 A1 * | 7/2012 | Huang | | B62H 3/12 248/121 |
| 2015/0090849 A1 * | 4/2015 | Breitweiser | | F16M 11/04 248/230.1 |
| 2016/0299408 A1 * | 10/2016 | Bailey | | G03B 15/06 |

FOREIGN PATENT DOCUMENTS

FR 2822665 A1 * 10/2002 ......... G09F 15/0025
JP 2001035320 A * 2/2001

* cited by examiner

PHOTOGRAPHY LIGHT PANEL REFLECTOR CLAMP

CROSS-REFERENCE TO RELATED APPLICATION

This application is a continuation-in-part of U.S. patent application Ser. No. 14/139,795, filed on Dec. 23, 2013, which is incorporated herewith by reference.

BACKGROUND OF THE INVENTION

1. Field of the Invention

The present invention relates to a photography light panel reflector clamp used in photographing and video recording. More particularly, the present invention is a photography light panel reflector clamp with a turning clamp set, which can be used to mount a photography light panel reflector with a rod member.

2. The Prior Arts

Photography light panel reflector is a type of auxiliary lighting tool used to reflect light, and is frequently used in photographing and video recording. When photography light panel reflectors are used during photographing or video recording, the colors of the photographs or videos are more enriched, and the photos or videos can be presented in a more stereoscopic manner. Photography light panel reflector can also be used to partially reflect light, so only the details in a certain portion of the photos or videos are clearer. In addition, the complementary effect created by the photography light panel reflector is softer, and is quite different from the sharpness created by using flash lights.

Conventionally, a photography light panel reflector is mounted with a rod member using ropes or tapes. However, these two mounting methods are very unstable and difficult to practice. The photography light panel reflector mounted with a rod member using ropes or tapes can be affected by external environment and fall off easily. Another way of mounting a photography light panel reflector with a rod member is using a spring clamp. Such spring clamps are exclusive for mounting the photography light panel reflector with rod members; however, due to the shape of spring clamps, photography light panel reflectors can be damaged, thereby lowering the durability of the photography light panel reflectors. There is another type of photography light panel reflector clamp which clamps the photography light panel reflector with two grooves configured on two separate clamping units. When using such clamps, the two separate clamping units need to be aligned precisely, thereby raising the difficulty of the assembling process. In addition, because the clamps are mounted on the photography light panel reflector by abutting the two grooves against the photography light panel reflector, if the two clamping units are not aligned in a precise manner, the photography light panel reflector can fall off easily.

Figure 1:
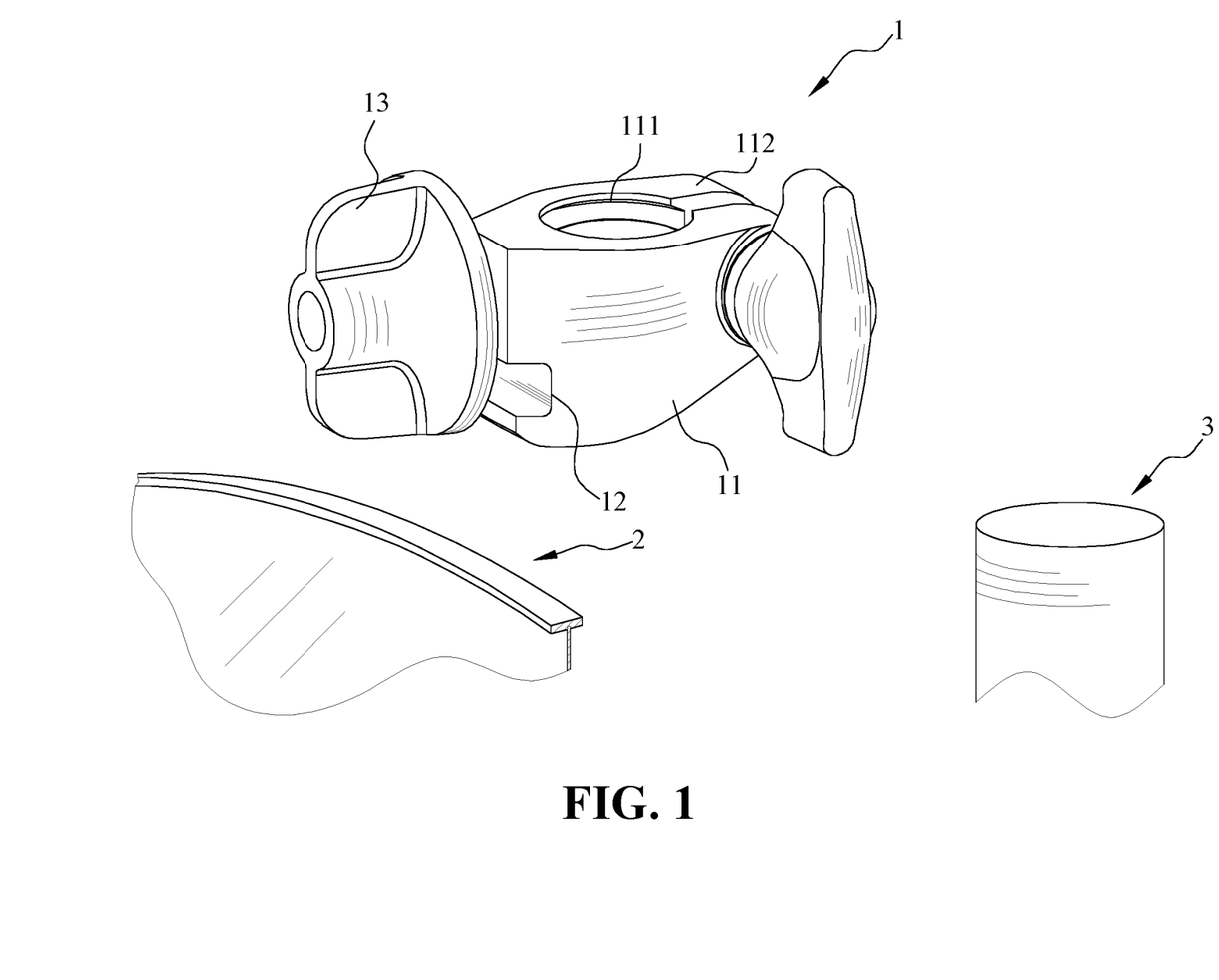
FIG. 1 is a perspective view showing a photography light panel reflector clamp according to the present invention.

US Application Publication 2004/0226903A1 discloses a display shelf device [see FIG. 1] comprising: a support post 10; a shelf member 30; and a coupler 1 having a ring member 10 attached the support post 10, a bracket 31 attached to the shelf member 30 and a fastener 17 securing the bracket 31 and the ring member 10 together at any selected position. It is noted that it is relatively difficult for securing the bracket 31 and the ring member 10 together, because the fastener 17 needs to extend through an orifice 32 in the bracket 31, only then engages the center screw hole 16 in the ring member 10. In the same manner, the bracket 31 can be dismantled from the shelf member 30 only the fastener 17 has been fully disengaged from the screw hole 16 in the ring member 10, thereby causing inconvenience to the users.

U.S. Pat. No. 5,634,619 discloses a clamp for use as part of a pole-supported apparatus [see FIG. 2], comprising: an article clamping portion 8 having a pair of arms (8a, 8b) oriented along a common plane and separated from each other to define a receiving channel 9 therebetween for receiving an article, such as display hardware. The article is then secured by inwardly disposed screws 11, which apply pressure thereto when tightened. One drawback provided by the present clamp apparatus resides in that frequent tightening of the screws 11 relative to the article can result in at least partially damage of the article in the long run.

SUMMARY OF THE INVENTION

Based on the above reasons, a primary objective of the present invention is to provide a photography light panel reflector clamp used in photographing and video recording, which can be mounted with a rod member quickly and stably without damaging the photography light panel reflector, thereby eliminating the drawbacks mentioned in the prior arts.

In order to fulfill the above objectives, a photography light panel reflector clamp is provided in the present invention. The photography light panel reflector clamp can be used to mount a photography light panel reflector with a rod member. The photography light panel reflector clamp of the present invention includes a central member, a groove and a turning clamp set. A rod member clamping seat is disposed on the central member, and a mounting portion is disposed at an opening of the rod member clamping seat. The groove is formed across a mounting face on a side of the central member, and the turning clamp set is mounted on the mounting face next to the groove. At least one photography light panel reflector clamp is mounted on the rod member via the rod member clamping seat. A flange of the photography light panel reflector has a segment fitted in the groove, and the turning clamp set is utilized to fix the segment of the flange in the groove and retain the segment of the flange between the groove and the turning clamp set. The turning clamp set includes a first turning knob having an abutting surface large enough to cover the groove and the abutting surface compresses against the segment of the flange when the first turning knob is screwed tightly.

With the turning clamp set and the groove provided by the present invention, the photography light panel reflector can be easily and quickly mounted with the rod member, and the damage to the photography light panel reflector can be minimized.

Comparing with the conventional mounting methods and the conventional clamps, the engagement provided by the present invention between the photography light panel reflector and the rod member is more stable, and the mounting process is also easier. On the other hand, when compared with the conventional spring clamps, the photography light panel reflector clamp provided by the present invention is less likely to damage the photography light panel reflector during the mounting process. When compared with the conventional two-pieces clamps, the photography light panel reflector clamp provided by the present invention does not require precise alignment and therefore the mounting process thereof is easier. The clamp provided by the present invention is also less likely to fall off. In addition, the clamp provided by the present invention can also be used to mount electric wire sets. The conventional clamps do not provide such function.

Comparing with US Application Publication 2004/0226903A1, when the user fits or takes off the photography light panel reflector, the first turning knob doesn't need to be taken off from the mounting face, and the user doesn't need to make an orifice on the photography light panel reflector. The photography light panel reflector can be easily and quickly mounted with the rod member.

Comparing with U.S. Pat. No. 5,634,619, the groove doesn't need any inwardly disposed screws. And the turning clamp set preferably includes a first turning knob defining an abutting surface with an area greater than so as to cover the groove and compressing against the segment of the flange. So the contact area among the first turning knob, the photography light panel reflector and the groove is greater than the contact area between the screws and the article. The damage to the photography light panel reflector can be minimized. And the photography light panel reflector can be easily and quickly mounted with the rod member.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENTS

The accompanying drawings are included to provide a further understanding of the invention, and are incorporated in and constitute a part of this specification. The drawings illustrate embodiments of the invention and, together with the description, serve to explain the principles of the invention.

Figure 2:
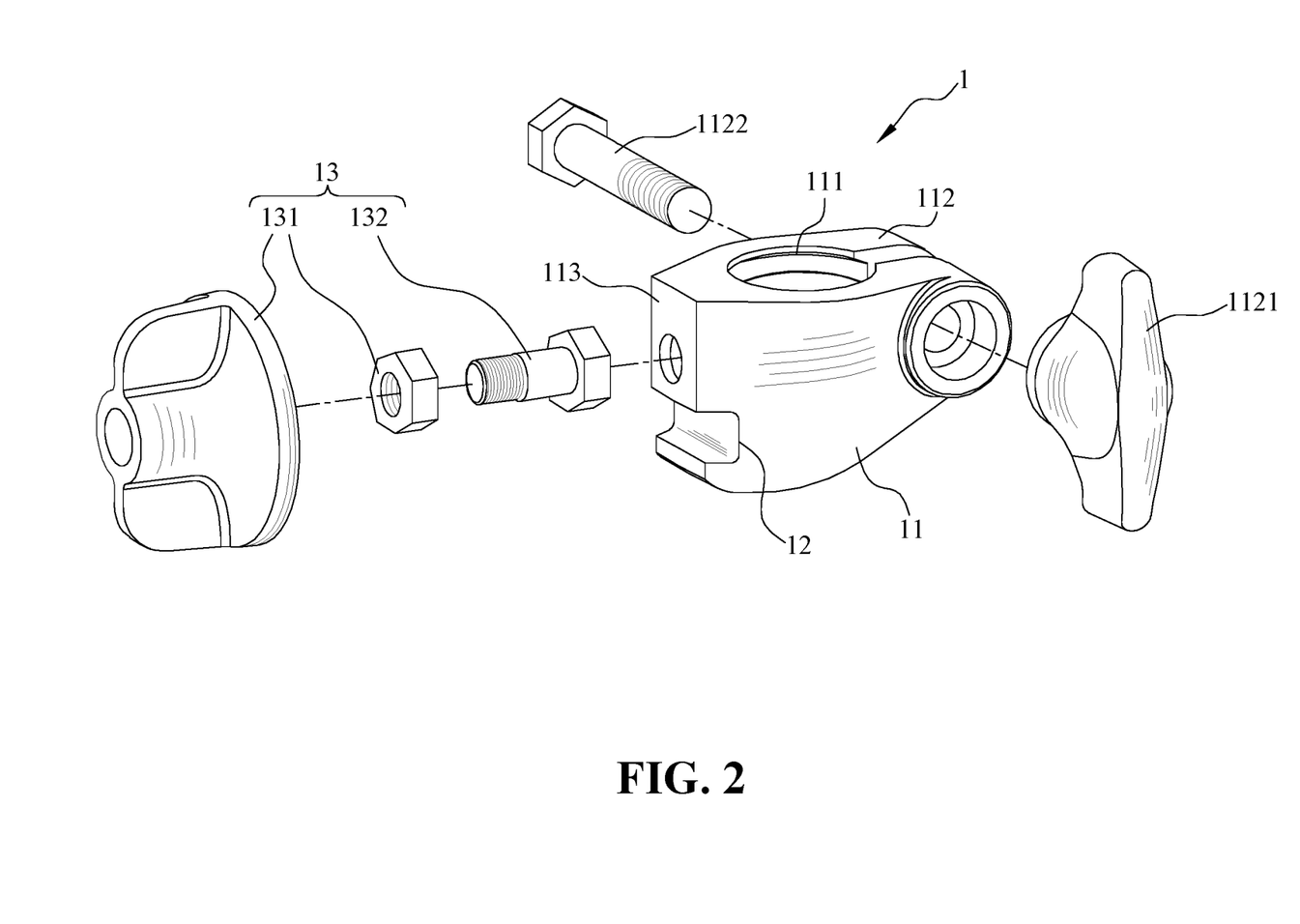
FIG. 2 is an exploded view showing the photography light panel reflector clamp according to the present invention.

FIG. 1 is a perspective view showing the photography light panel reflector clamp 1 of the present invention; FIG. 2 is an exploded view showing the photography light panel reflector clamp 1 of the present invention. As shown in FIG. 1 and FIG. 2, the present invention is a photography light panel reflector clamp 1 for mounting a photography light panel reflector 2 with a rod member 3. The photography light panel reflector 2 preferably is like ones that is frequently used in photographing, video recording and movie making industry. The photography light panel reflector clamp 1 includes a central member 11, a groove 12 and a turning clamp set 13. A rod member clamping seat 111 is disposed on an appropriate portion of the central member 11, and a mounting portion 112 is disposed at an opening of the rod member clamping seat 111. The groove 12 is formed across a mounting face 113 of the central member 11, and the turning clamp set 13 is disposed on an appropriate portion of the mounting face 113 next to the groove 12. At least one photography light panel reflector clamp 1 is mounted on the rod member 3 via the rod member clamping seat 111. A flange of the photography light panel reflector 2 has a segment fitted in the groove 12, and the turning clamp set 13 is utilized to fix the segment of the flange in the groove 12 with the photography light panel reflector clamp 1.

It can be seen from FIG. 2 that the turning clamp set 13 includes a first female turning knob 131 embedded with a nut and a first male screw 132. The first male screw 132 is mounted on the mounting face 113, and the first female turning knob 131 is engaged with the first male screw 132 in front of the mounting face 113. Note that wherein, the turning clamp set 13 includes a first turning knob 131 having an abutting surface large enough to cover the groove 12 and the abutting surface compresses against the segment of the flange when the first turning knob is screwed tightly. In this way, the segment of the flange of the photography light panel reflector 2 is fixed in the groove 12 and retained between the groove 12 and the first female turning knob 131. It should be noted that in this embodiment, the central member 11 preferably has a mounting surface 113 disposed on a side of the central member 11. The mounting face 113 has a hole for holding the first male screw 132 at least partially therein and a U-shaped channel is further formed across the mounting face 113 to serve as the groove 12.

By fixing the segment of a flange of the photography light panel reflector with the groove 12 and the first female turning knob 131, the photography light panel reflector 2 is less likely to fall off, and it is also less likely for the photography light panel reflector 2 to be damaged. To be more specific, the segment of a flange of the photography light panel reflector is fixed between the groove 12 and the first female turning knob 131 by tightening the first female turning knob 131 toward the first male screw 132.

The mounting portion 112 further includes a second female turning knob 1121 and a second male screw 1122. The second female turning knob 1121 is engaged with the second male screw 1122 so as to mount the rod member clamping seat 111 with the rod member 3.

To be more specific, first, the rod member clamping seat 111 is sleeved around the rod member 3. Then, the second female turning knob 1121 is tightened toward the second male screw 1122 to tighten the opening of the rod member clamping seat 111. In this way, the rod member clamping seat 111 is mounted with the rod member 3.

Figure 3:
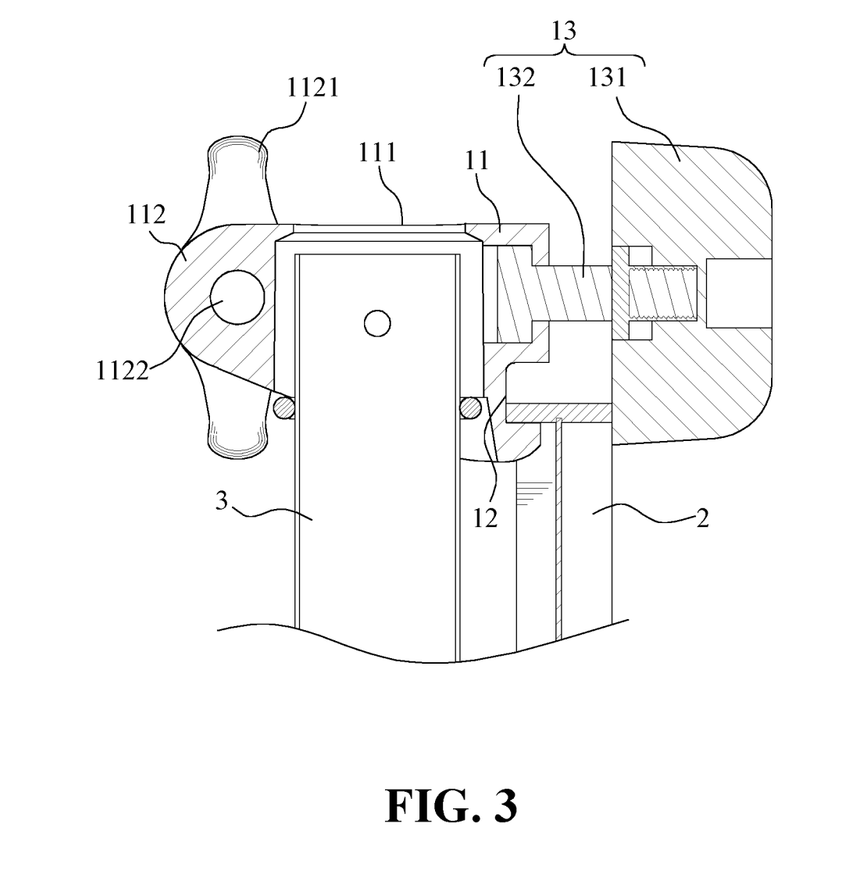
FIG. 3 is a section view showing the photography light panel reflector clamp according to the present invention.

FIG. 3 is a section view showing the photography light panel reflector clamp 1 of the present invention. In the following section, an embodiment of the present invention is further explained with reference to FIG. 3. After the rod member clamping seat 111 is sleeved around the rod member 3, the second female turning knob 1121 is engaged with and tightened toward the second male screw 1122. The rod member clamping seat 111 is then tightened and clamps tightly with the rod member 3. The first male screw 132 is mounted inside the mounting face 113. The first female turning knob 131 is engaged with the exposed portion of the first male screw 132. After the first female turning knob 131 is tightened with the first male screw 132, the segment of a flange of the photography light panel reflector is fixed between the groove 12 and the first female turning knob 132. In addition, the shape of the groove 12 is configured corresponding to the shape of the flange of the photography light panel reflector, so the segment of a flange of the photography light panel reflector is fixed between the groove 12 and the first female turning knob 131 in a more stable manner.

Figure 4:
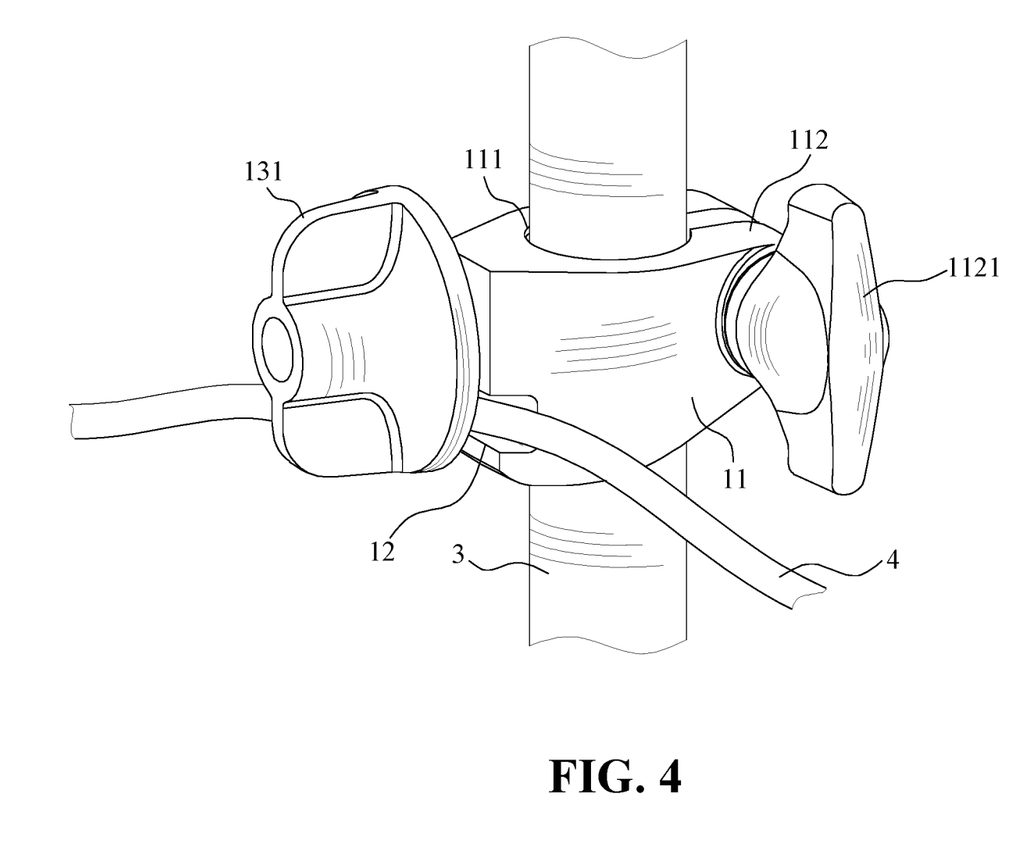
FIG. 4 is a perspective view showing a photography light panel reflector clamp according to a first embodiment of the present invention.

FIG. 4 is a perspective view showing the photography light panel reflector clamp according to a first embodiment of the present invention. In addition to clamping the photography light panel reflector 2, the present invention can also be used to mount wire sets 4 of lighting devices or other electronic equipments. As shown in FIG. 4, wire sets 4 can be fitted inside the groove 12, and can be restricted inside the groove 12 by tightening the first female turning knob 131.

Figure 5:
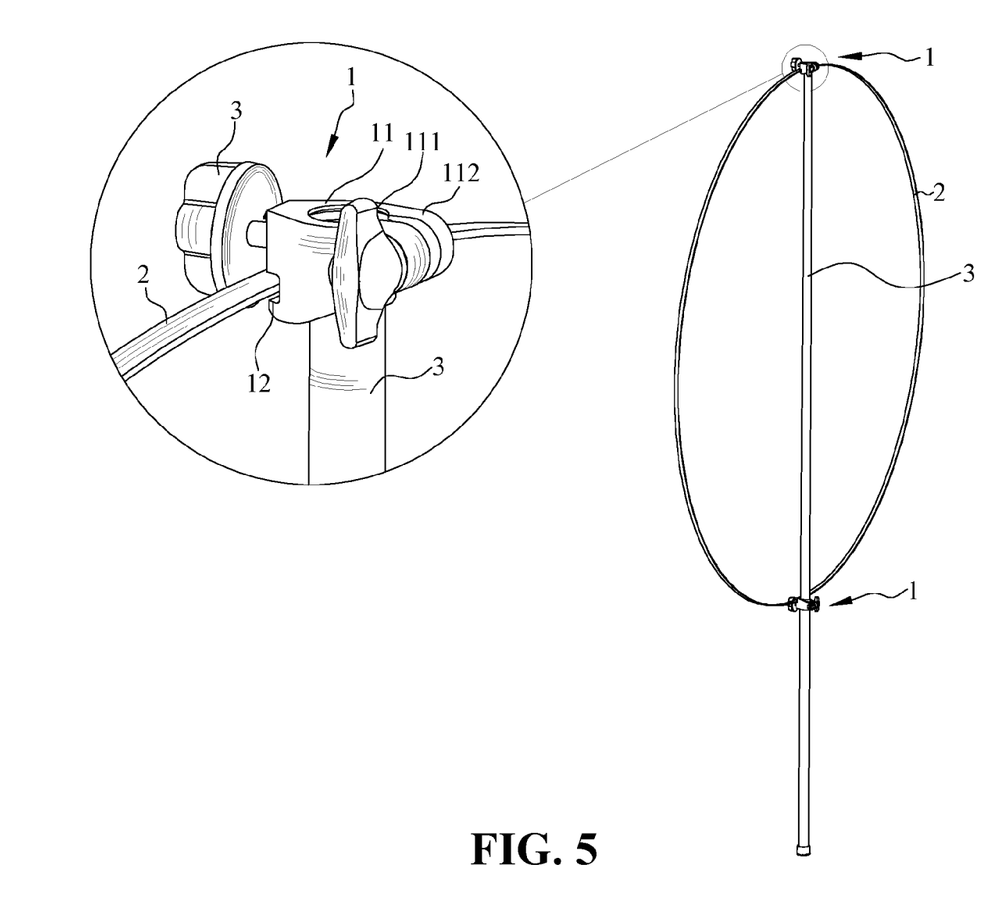
FIG. 5 is a perspective view showing a photography light panel reflector clamps according to a second embodiment of the present invention.

FIG. 5 is a perspective view showing the photography light panel reflector clamps according to a second embodiment of the present invention, which is also a preferred embodiment of the present invention. In the second embodiment, two photography light panel reflector clamps 1 are used to mount the photography light panel reflector 2. As shown in FIG. 5, the photography light panel reflector clamps 1 are mounted on any two opposite ends of the photography light panel reflector 2, and then the photography light panel reflector clamps 1 are mounted with the rod member 3. In this way, the photography light panel reflector 2 can be stably mounted with the rod member 3 via the photography light panel reflector clamps 1 provided by the present invention. The rod member 3 can be a tripod stand, which can be easily adjusted by the user.

Figure 6:
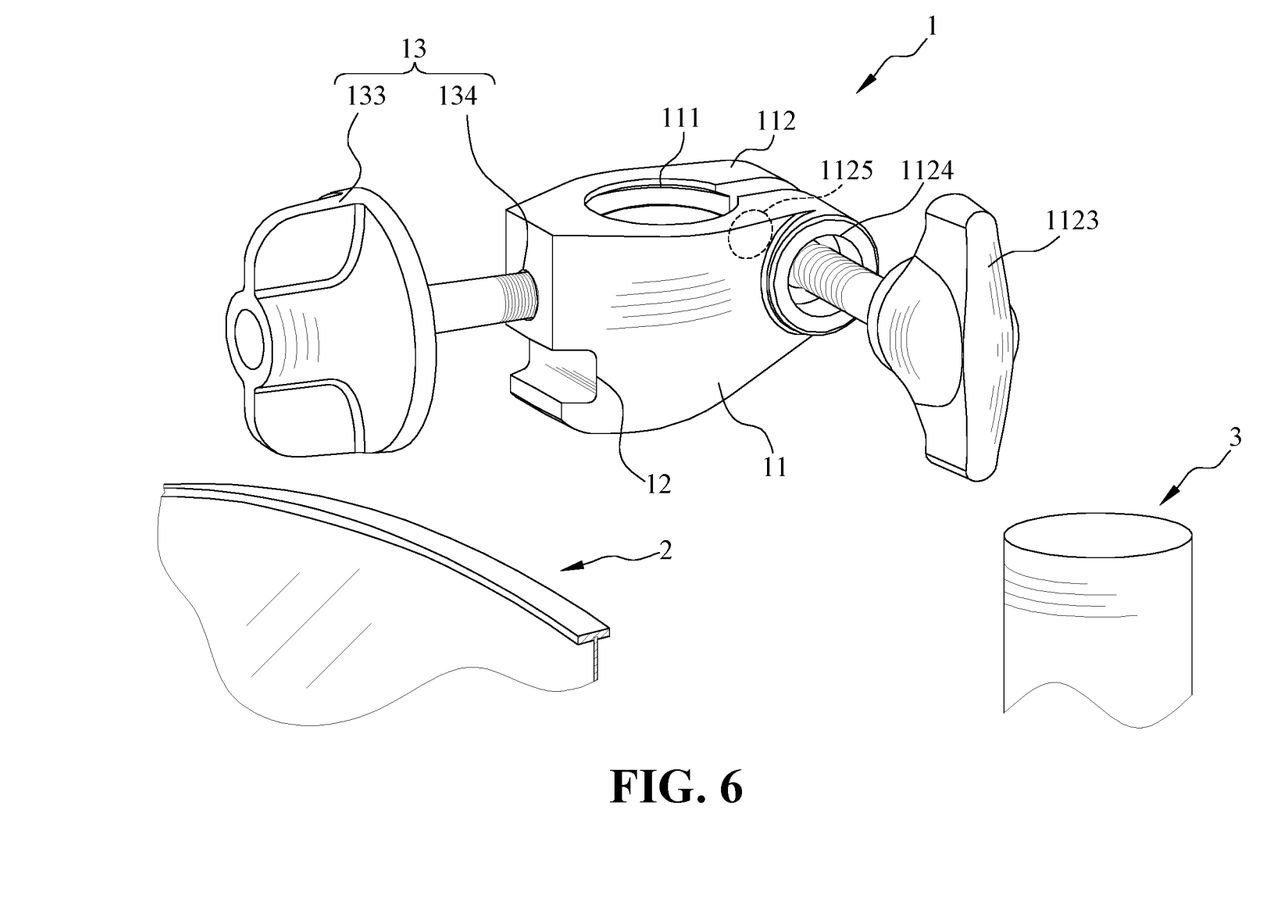
FIG. 6 is a perspective view showing a photography light panel reflector clamp according to a third embodiment of the present invention.

FIG. 6 is a perspective view showing the photography light panel reflector clamp according to a third embodiment of the present invention. As shown in FIG. 6, the turning clamp set 13 of the present invention can also be a first male turning knob 133. A first tapped hole 134 is disposed on the mounting face 113 next to the groove 12. The first male tuning knob 133 is engaged with the first tapped hole 134 so as to fix the segment of the photography light panel reflector 2 between the groove 12 and the first male turning knob 133.

According to the third embodiment, the mounting portion 112 further includes a second male turning knob 1123. A fitting hole 1124 is disposed on a side of the mounting portion 112, and a second tapped hole 1125 is disposed on another side of the mounting portion 112 corresponding to the fitting hole 1124. The second male turning knob 1123 is put through the fitting hole 1124 and is engaged with the second tapped hole 1125, thereby mounting the rod member clamping seat 111 with the rod member 3.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A photography light panel reflector clamp for mounting a photography light panel reflector with a rod member, comprising:
   a central member having a rod member clamping seat formed on the central member, a mounting portion formed at an opening of the rod member clamping seat, and a mounting face formed on a side of the central member;
   a groove being formed across the mounting face of the central member; and
   a turning clamp set being mounted on the mounting face next to the groove;
   wherein at least one photography light panel reflector clamp is mounted on the rod member via the rod member clamping seat, a segment of a flange of the photography light panel reflector is fitted in the groove, and the turning clamp set is utilized to fix the segment of the flange in the groove and retain the segment of the flange between the groove and the turning clamp set;
   wherein the turning clamp set includes a first turning knob having an abutting surface large enough to cover the groove, the abutting surface compresses against the segment of the flange when the first turning knob is screwed tightly, and the groove has a U-shaped channel defined therein and is configured corresponding to the shape of the flange of the photography light panel reflector.

2. The photography light panel reflector clamp according to claim 1, wherein the first turning knob is a first female turning knob embedded with a nut and the turning clamp set further includes a first male screw, wherein the first male screw is mounted on the mounting face, and the first female turning knob is engaged with the first male screw in front of the mounting face, thereby fixing the segment of the flange in the groove and retaining the segment of the flange between the groove and the first female turning knob.

3. The photography light panel reflector clamp according to claim 1, wherein the mounting portion further comprises a second female turning knob and a second male screw, wherein the second female turning knob is engaged with the second male screw, thereby mounting the rod member clamping seat with the rod member.

4. The photography light panel reflector clamp according to claim 1, wherein the turning clamp set is a first male turning knob, and a first tapped hole is disposed on the mounting face next to the groove, wherein the first male tuning knob is engaged with the first tapped hole in front of the mounting face so as to fix the segment of the flange and retain the segment of the flange between the groove and the first male turning knob.

5. The photography light panel reflector clamp according to claim 1, wherein the mounting portion further comprises a second male turning knob, a fitting hole is disposed on a side of the mounting portion, and a second tapped hole is disposed on another side of the mounting portion corresponding to the fitting hole; wherein the second male turning knob is put through the fitting hole and is engaged with the second tapped hole, so as to mount the rod member clamping seat with the rod member.

* * * * *